United States Patent
Lindner et al.

(10) Patent No.: US 11,040,294 B2
(45) Date of Patent: Jun. 22, 2021

(54) LABORATORY DEVICE FOR EVAPORATING A SUBSTANCE

(71) Applicant: Hans Heidolph GmbH, Kelheim (DE)

(72) Inventors: Lea Lindner, Nuremberg (DE); Robert Loschel, Schwabach (DE)

(73) Assignee: Hans Heidolph GmbH, Kelheim (DE)

( * ) Notice: Subject to any disclaimer, the term of this patent is extended or adjusted under 35 U.S.C. 154(b) by 0 days.

(21) Appl. No.: 16/626,822

(22) PCT Filed: Jun. 26, 2018

(86) PCT No.: PCT/EP2018/067171
§ 371 (c)(1),
(2) Date: Dec. 26, 2019

(87) PCT Pub. No.: WO2019/002326
PCT Pub. Date: Jan. 3, 2019

(65) Prior Publication Data
US 2020/0129879 A1   Apr. 30, 2020

(30) Foreign Application Priority Data
Jun. 27, 2017 (DE) .................... 20 2017 003 355.0

(51) Int. Cl.
*B01D 3/08* (2006.01)
*B01D 3/42* (2006.01)
(Continued)

(52) U.S. Cl.
CPC .............. *B01D 3/085* (2013.01); *B01D 3/42* (2013.01); *B01D 19/0063* (2013.01); *B01D 19/02* (2013.01)

(58) Field of Classification Search
CPC ........... B01D 3/085; B01D 3/42; B01D 19/02
See application file for complete search history.

(56) References Cited

U.S. PATENT DOCUMENTS 7,153,396 B2 * 12/2006 Genser .................. B01D 3/085
  203/1
2003/0000651 A1   1/2003 Genser
(Continued)

FOREIGN PATENT DOCUMENTS

DE     198 03 711 A1    8/1999
DE     101 14 434 A1   10/2002
(Continued)

OTHER PUBLICATIONS

International Search Report issued in PCT/EP/2018/067171 dated Aug. 14, 2018.

*Primary Examiner* — Renee Robinson
(74) *Attorney, Agent, or Firm* — Locke Lord LLP; Scott D. Wofsy

(57) ABSTRACT

A laboratory device, in particular a rotary evaporator, serves for evaporating a substance, preferably under reduced pressure, and comprises an evaporation flask for receiving the substance to be evaporated, a condenser for condensing the evaporated substance and a vapor passage for passing through the evaporated substance, which vapor passage is arranged in a vapor path between the evaporation flask and the condenser. The laboratory device further comprises a detection unit for foam detection, which detection unit is provided outside of the vapor passage and/or the evaporation flask.

22 Claims, 3 Drawing Sheets

Figure 1:
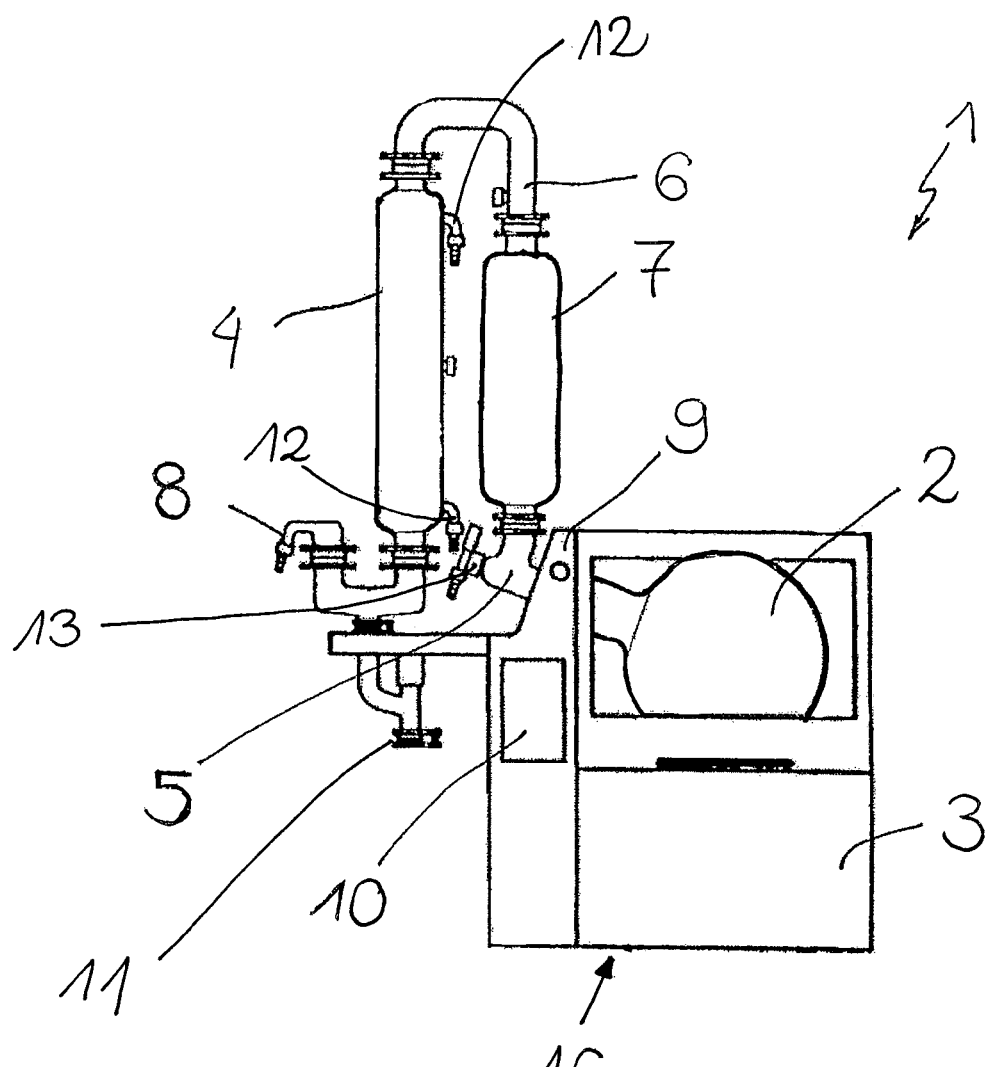

(51) Int. Cl.
*B01D 19/00* (2006.01)
*B01D 19/02* (2006.01)

(56) References Cited

U.S. PATENT DOCUMENTS

2003/0111185 A1  6/2003  Genser
2010/0193140 A1  8/2010  Carl
2016/0136539 A1  5/2016  Carl et al.

FOREIGN PATENT DOCUMENTS

DE  102 26 478 A1  4/2003
DE  10 2013 204 459 A1  9/2014
EP  2873965 A1  5/2015

\* cited by examiner

LABORATORY DEVICE FOR EVAPORATING A SUBSTANCE

CROSS REFERENCE TO RELATED APPLICATIONS

This application is a U.S. National Phase Application filed under 35 U.S.C. § 371, based on International PCT Patent Application No. PCT/EP2018/067171, filed Jun. 26, 2018, which application claims priority to German Patent Application No. 20 2017 003 355.0 filed on Jun. 27, 2017. The entire contents of these applications is incorporated herein by reference in their entireties.

The present invention relates to a laboratory device for evaporating a substance, in particular to a detection device for foam detection contained in this device.

Such a laboratory device is, for example, a rotary evaporator which comprises a rotary flask for receiving the substance to be evaporated. The substance to be evaporated is heated by heating the rotary flask in a heating bath and the vapor is passed through a vapor passage into a condenser where it is cooled and thereby condensed.

In this case, bubbles can form in the initial substance or foam can develop at its upper side. If it penetrates into the vapor passage and/or the condenser, there is a risk of contamination of the distillate.

DE 10 2013 204 459 A1 therefore suggests arranging a mechanical foam breaker designed as a rotor in the vapor path between the rotary flask and the condenser. Thereby, the rotating foam breaker comes into direct contact with the rising foam and destroys it.

Furthermore, a lance is known to the applicant, which lance is introduced into the rotary flask or in the vapor path to detect developing foam. In doing so, the lance is also in direct contact with the rising foam and the evaporated substance, It is an object of the present invention to provide an alternative or improved laboratory device for evaporating a substance, with which in particular a detection and/or reduction of foam is possible, wherein the risk of contamination of the substance to be evaporated is avoided.

This object is achieved by a laboratory device according to claim 1 and a laboratory device according to claim 14. Further developments of the invention are given in the dependent claims. The laboratory device according to claim 14 can also be further developed by the features of the laboratory device according to claim 1, which features are given below or in the dependent claims.

According to the invention, a laboratory device is in particular a rotary evaporator and serves to evaporate a substance, preferably under reduced pressure. The laboratory device has an evaporation flask for receiving the substance to be evaporated, a condenser for condensing the vaporized substance and a vapor passage for passing through the vaporized substance, which vapor passage is arranged in a vapor path between the evaporation flask and the condenser. The laboratory device further comprises a detection unit for foam detection, which detection unit is provided outside of the vapor passage and/or of the evaporation flask.

Here, the term "substance" or "material" is to be understood as meaning both pure substances and mixtures which can be present in the liquid and/or solid phase. The vaporized substance can comprise all or only one or more than one components of the initial substance and after evaporation it is present in the gas phase. In the following it is also referred to as distillate.

With such a laboratory device it is possible, for example, to detect developing foam in the vapor passage and/or in the evaporation flask in a non-contact way, i.e. without the detection device coming into direct contact with the foam, the vapor or the initial substance. Thus, for example, the vapor passage can be formed as a single part and/or without engagement openings that require sealing. Furthermore, possible contamination of the initial substance can be avoided since no part of the detection unit extends into the foam.

Preferably, the detection unit is provided at a position after a standard joint of the evaporation flask. For example, the detection unit can be provided on an exterior of the vapor passage. This enables, for example, good detection of developing foam.

Preferably, the vapor passage has a widening portion and the detection unit for foam detection is preferably attachable to the widening portion. The widening portion can be designed, for example, such that occurring foam initially accumulates therein before further propagating in the vapor path, thus, for example, facilitating detection by the sensor.

Preferably, a geometry of the detection unit is adapted to a geometry of at least a portion of the evaporation flask or of the vapor passage, preferably of a widening portion of the vapor passage. Thus, for example, foam detection can take place over as large a region, such as a diameter, of the vapor passage as possible.

Preferably, the detection unit has a bifurcate shape and encloses the vapor passage and/or the evaporation flask at least partially. Thus, for example, foam in the vapor passage or the evaporation flask can be detected in a simple manner.

Preferably, the detection unit can is mountable on an exterior of the vapor passage or on a housing of the laboratory device by means of a mounting device. In this case the detection unit is further preferably movably, preferably pivotably, connected to the mounting device, so that the detection unit can be moved from the vapor passage and/or the evaporation flask into a measuring position and into a position at a distance to the measuring position. Thus, it is possible, for example, to mount the detection unit at a suitable position of the vapor passage and/or to remove the detection unit from the same. Preferably, in doing so, the detection unit can, for example, be folded away or pivoted away or completely removed from the vapor passage or the evaporation flask while the mounting device, for example, remains on the apparatus and/or is completely removed.

Preferably, the detection unit comprises at least one sensor for detecting a signal, wherein the sensor is preferably an optical sensor, further preferably a red light sensor. With a sensor, in particular a red light sensor, an alteration of the signal upon occurrence of foam can be registered, for example.

The laboratory apparatus preferably further comprising means for foam reduction, wherein the means for foam reduction can be operated manually and/or automatically. Here, "means for foam reduction" or a "device for foam reduction" is to be understood as a device which is suited to reduce and/or eliminate foam. Thus, for example, arising foam can be reduced and/or eliminated immediately after being detected by the detection unit.

Preferably, the device for foam reduction is configured as a gas inlet for supplying a gas, in particular air or an inert gas, in a metered way. This allows, for example, to reduce or eliminate occurring foam in a non-contact way and in a simple and fast way.

Furthermore, the laboratory device preferably comprises an evaluation unit for evaluating a signal detected by the detection unit. Thus, an automatic detection of foam in the vapor passage is possible, for example.

A control unit for a laboratory device according to the invention is configured and/or programmed to control a device for foam reduction in response to a signal of a detection unit for foam detection. Thus, for example, a reduction and/or elimination of foam can take place automatically.

Preferably, the control unit is further configured and/or programmed to control a temperature in the laboratory device, in particular of a heating bath, and/or a rotation speed of a rotatable evaporation flask and/or a device for generating a reduced pressure. Thus, it is possible, for example, to adapt process parameters prior to, during and/or after the evaporation process in such a way that arising of foam is reduced, preferably avoided.

A laboratory device according to the invention comprises a container for receiving a substance and a detection unit for detecting foam, wherein the detection unit is arranged outside of the container and/or of another element into which foam generated in the container can penetrate. Preferably, the detection unit has at least one sensor for detecting a signal, wherein the sensor is preferably an optical sensor, further preferably a red light sensor. Preferably, the laboratory device further comprises a device for foam reduction that is further preferably controllable in response to a signal of the detection unit.

Thus, it is possible, for example, to achieve the effects described above with regard to a laboratory device for evaporating a substance also generally in laboratory devices in which foam may arise.

Further features and expediencies of the invention will become apparent from the description of embodiments with reference to the accompanying figures.

Figure 2A:
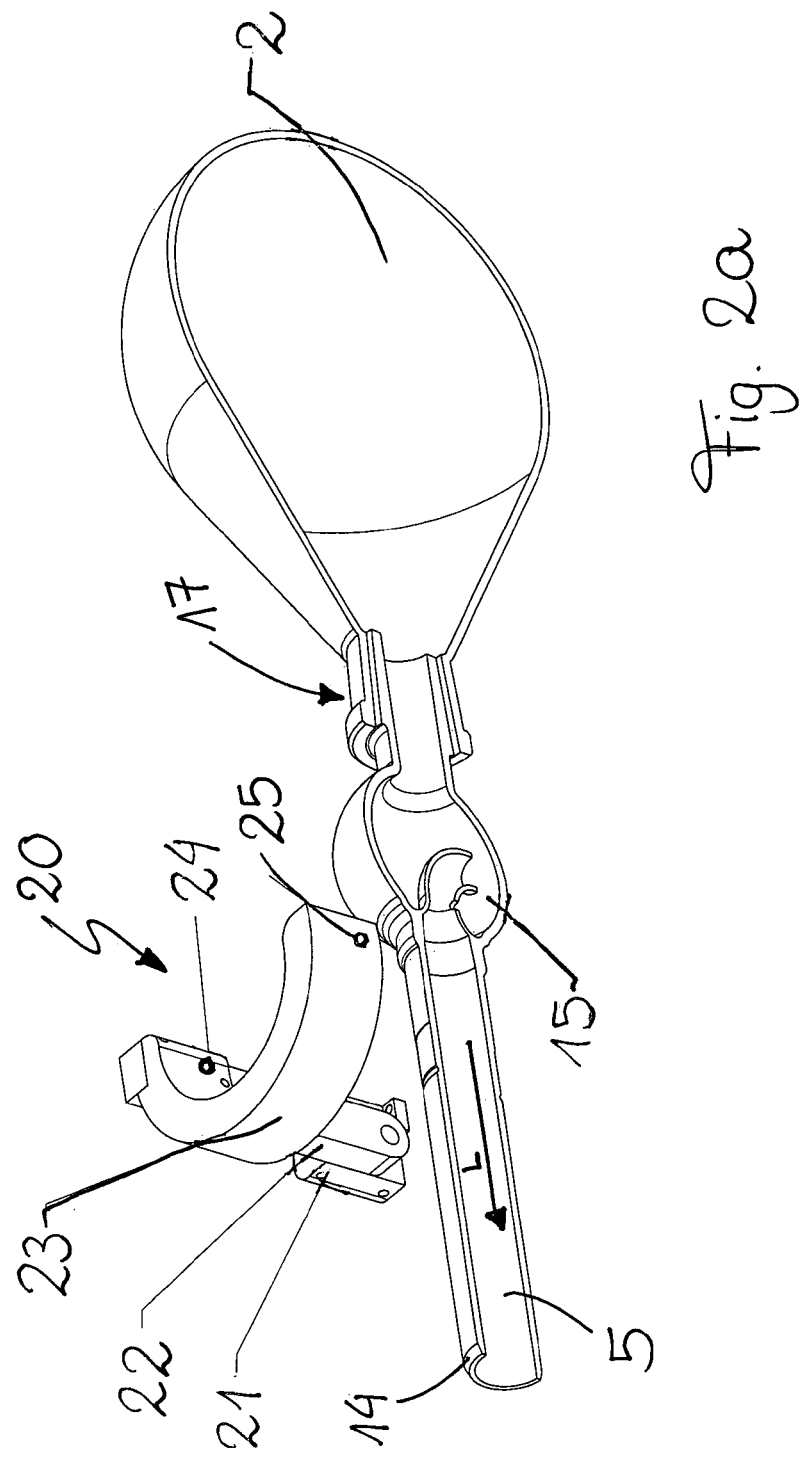
Figure 2B:
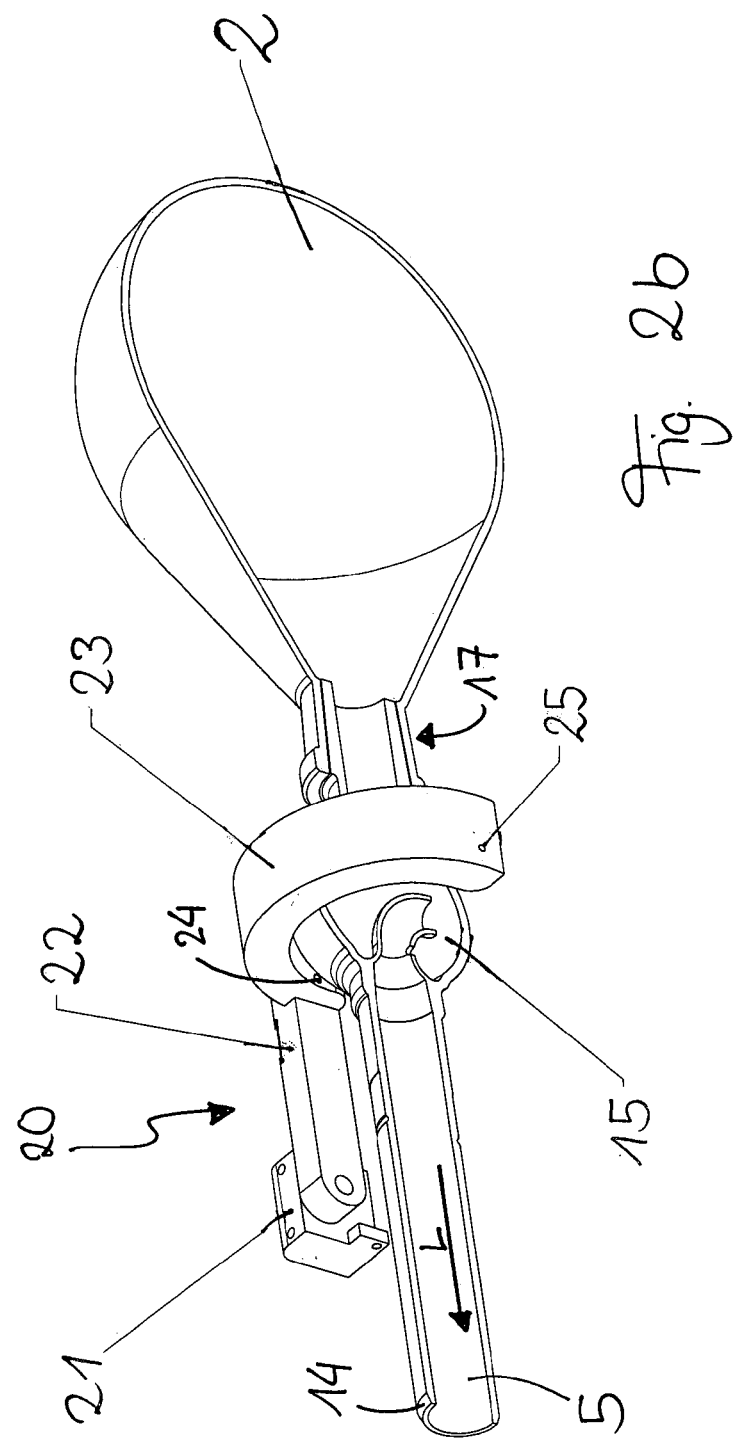

FIG. 1 shows a schematic view of a rotary evaporator according to the present invention, FIGS. 2a and 2b show schematic views, partially in cross-section, of a detection device for foam detection that is in accordance with the invention and contained in the rotary evaporator shown in FIG. 1.

Hereafter, an embodiment of the present invention will be described with reference to FIG. 1. The laboratory device shown in FIG. 1 is a rotary evaporator 1. The rotary evaporator optionally has a housing 16. For receiving an initial substance, the rotary evaporator comprises an evaporation flask 2 that is rotatable about a rotation axis by means of a rotary drive 9. The evaporation flask 2 can be designed as a round-bottom flask made of glass, for example. The initial substance can be a pure substance or else a mixture and is present in the liquid and/or solid phase in the evaporation flask 2. It contains the substance to be evaporated.

The evaporation flask 2 is arranged in a heating bath 3 with a heatable liquid, for example water. By means of a vertical drive not shown in FIG. 1 the immersion depth of the evaporation flask 2 in the liquid of the heating bath 3 can be adjusted.

The rotary evaporator 1 further comprises a condenser 4, which is connected to the evaporation flask 2 via a vapor passage 5, a vapor supply 6 and optionally an expansion vessel or a pre-cooler 7. Therein, the evaporation flask 2 and the condenser 4, together with the elements arranged in the vapor path between them, preferably form a system sealed in a gas-tight manner. For supplying a gas into the sealed system, preferably air or an inert gas, a gas inlet valve 13 is provided preferably on the vapor passage 5. Furthermore, the condenser 4 has a vacuum connection 8 for connecting a vacuum pump (not shown in FIG. 1) for generating a reduced pressure down to a vacuum in the gas-tight sealed system. Connections 12 are provided for supplying and discharging of a cooling medium. Furthermore, the condenser 4 has an outlet valve 11 for the condensed distillate.

Furthermore, the rotary evaporator comprises an operating unit 10 for controlling the rotary drive 9, the heating bath 3, a vacuum pump and the vertical drive, and optionally a control unit not shown in FIG. 1, by means of which the gas inlet valve 13 is controlled in a coordinated manner. The operating unit 10 can, for example, be arranged on the housing 16.

FIGS. 2a and 2b show the evaporation flask 2 and the vapor passage 5 connected thereto by means of a standard joint 17, and a detection device 20 with a detection unit 23 for foam detection. In FIG. 2a, the detection unit 23 is shown in a first position at a distance from the vapor passage 5 and in FIG. 2b in a second position in which the detection unit is attached to the vapor passage 5 in a measuring position.

The vapor passage 5 confined by a wall 14 extends substantially in a longitudinal direction L and is configured to convey vapor in the longitudinal direction L. It is made of glass or of a transparent plastic, for example. The vapor passage further has a chamber 15 that is formed as a widening of the vapor passage 5.

The detection device 20 comprises a holder or mounting device 21 for attachment to the vapor passage 5 or to a housing 16, and a detection unit 23 that is connected to the mounting device 21 via a pivoting arm 22. The detection unit 23 is substantially formed semicircular or in the shape of a half-ring or has a bifurcate shape. Preferably, the detection unit 23 is adapted to a shape of an outer portion of the chamber 15 perpendicular to the longitudinal direction L, as shown in FIG. 2b. A sensor configured as a light barrier, preferably a red light sensor, is arranged on the detection unit 23, which sensor comprises a source 24 and a receiver 25 for electromagnetic radiation.

The wavelength of the radiation emitted by the source 24 is preferably in the range of red light or infrared light and is configured, for example, as a light-emitting diode. The receiver is configured to receive the radiation emitted by the source and is configured, for example, as a photodiode. The source 24 and the receiver 25 of the light barrier are arranged on a side of the detection unit 23 facing the chamber 15 in such a way that they are located substantially on opposed sides of the chamber 15 when the detection unit 23 is attached to the vapor passage 5. Thus, the light beam emitted by the source 24 travels through the chamber 15. In this measuring position shown in FIG. 2b, the detection unit 23 is configured to detect foam occurring in the chamber 15. The semicircular or bifurcate-shaped detection unit 23 encloses the chamber 15 in a circumferential direction at least in a section thereof.

The mounting device 21 is attached to the housing, so that no element of the detection device is arranged in the vapor path. Alternatively, the mounting device 21 can also be attached to the exterior of a wall 14 of a longitudinal portion of the vapor passage 5.

According to the embodiment of the detection device for foam detection, the detection unit 23 is movably connected to the mounting device 21 so that, in the case of non-foaming substances, for example, the detection unit 23 can be arranged at a distance to the chamber 15, for example folded away or pivoted away from the chamber, without detaching the mounting device 21 from the housing 16 or the vapor passage 5. FIG. 2a shows this first position.

For evaluating the signal of the receiver 25, the rotary evaporator 1 comprises an evaluation unit (not shown in FIG. 1). Furthermore, the light barrier can be controlled by the control unit and/or the control unit can directly receive the signal of the light barrier.

During operation, first an initial substance that contains the substance to be evaporated is poured in the evaporation flask 2. The evaporation flask 2 is then rotated by the rotary drive 9. By immersing in the heating bath 3 and/or applying a reduced pressure that can reduced the boiling temperature of the distillate, the distillate is evaporated from the initial substance. Due to the rotation of the evaporation flask 2, a thin film, for example a liquid film, of the initial substance is generated on its inner surface, so that the surface of the initial substance is enlarged and the evaporation is accelerated. Via the vapor passage 5, the vapor supply 6 and optionally the expansion vessel 7, the evaporated distillate enters the condenser 4 where it is cooled and condenses. The liquefied distillate flows through the outlet valve into a collection flask not shown in FIG. 1 and can be removed there.

In the course of this, the source 24 emits a light beam that passes through the chamber 15 and then impinges on the receiver 25. If the light beam encounters foam during its passage, the light beam, among other things, is reflected and/or refracts and thus no longer reaches the receiver 25 or only attenuatedly reaches the receiver. This alteration of the receiver signal is registered by the evaluation unit and a corresponding signal is forwarded to the control unit, which in turn sends a control command to the gas inlet valve for temporarily opening the gas inlet valve 13 so that a metered amount of gas, for example air or an inert gas, flows in through the gas inlet valve 13 and thus increases the pressure in the vapor path and in particular in the chamber 15. Due to the increase in pressure the foam bubbles are partially or completely destroyed. After closing the gas inlet valve 13 preferably a desired reduced pressure is set again within the vapor path by means of the vacuum pump.

Optionally, the reduced pressure generated by the vacuum pump and/or a temperature of the heating bath and/or the rotation speed of the evaporation flask can be altered during the evaporation process in such a way that arising of foam occurs less frequently and/or to a lesser extent or not at all. For this purpose, the control of the rotary drive and/or of the heating bath and/or of the vacuum pump and/or of the vertical drive can also be carried out by the control unit.

The use of a detection device according to the invention is not limited to an application in a rotary evaporator or a laboratory device for evaporating a substance. Rather, the invention can be applied in all laboratory devices and processes in which arising of foam can occur, such as magnetic stirrers, agitators or shaking and mixing devices.

The detection device can be a part of the laboratory device, as described above, but it can also be provided as a separate module for equipping and/or retrofitting such a laboratory device. Such an equipping and/or retrofitting kit can further comprise a suitable vapor passage having a chamber whose geometry is adapted to a shape of the detection element.

Furthermore, the gas inlet valve does not necessarily have to be arranged in the vapor passage. Instead, it can be arranged at any position in the vapor path between the evaporation flask and the condenser, in particular at an expansion vessel. The gas inlet valve can also be manually operatable so that a subsequent adjustment of the reduced pressure and/or a manual venting for foam destruction are possible.

The mounting device of the detection device can also be mounted on another suitable element of the laboratory device and the detection element for foam detection can be provided at any position outside the vapor path, in particular on an outer side of the flask. The vapor passage can also be formed without a chamber so that foam detection takes place at a longitudinal section of the vapor passage.

By means of the detection device not only the occurrence of foam can be detected, but it is also possible to draw conclusions on a density and/or amount of foam. For this purpose, an attenuated signal of the light barrier is evaluated, wherein the signal strength is a measure for the density or the amount of foam generated. In doing so, the attenuated signal of the light barrier can be set in relation to a non-attenuated signal.

The invention relates not only to foam detection by means of a red light sensor. Rather, also other optical and/or acoustic sensors or other suitable sensors can be used.

The invention claimed is:

1. A laboratory device, for evaporating a substance to form an evaporated substance, the laboratory device comprising;
    an evaporation flask for receiving the substance to be evaporated;
    a condenser for condensing the evaporated substance; and
    a vapor passage for passing through the evaporated substance, which vapor passage is arranged in a vapor path between the evaporation flask and the condenser, wherein
    the laboratory device further comprises a detection unit for foam detection, which detection unit is provided outside of the vapor passage and/or of the evaporation flask, the detection unit having a bifurcate shape and at least partially enclosing the vapor passage and/or the evaporation flask.

2. The laboratory device according to claim 1, wherein the detection unit is provided at a position after a standard joint of the evaporation flask.

3. The laboratory device according to claim 1, wherein the vapor passage has a widening portion and the detection unit for foam detection is provided on the widening portion.

4. The laboratory device according to claim 3, wherein a geometry of the detection unit is adapted to a geometry of the widening portion of the vapor passage.

5. The laboratory device according to claim 1, wherein a geometry of the detection unit is adapted to a geometry of at least a portion of the evaporation flask or of the vapor passage.

6. The laboratory device according to claim 1, wherein the detection unit is mountable on an exterior of the vapor passage or on a housing of the laboratory device by means of a mounting device.

7. The laboratory device according to claim 6, wherein the detection unit is movably connected to the mounting device, such that the detection unit can be moved from the vapor passage and/or the evaporation flask to a measuring position and to a position at a distance to the measuring position.

8. The laboratory device according to claim 7, wherein the detection unit is pivotably connected to the mounting device.

9. The laboratory device according to claim 1, wherein the detection unit has at least one sensor for detecting a signal.

10. The laboratory device according to claim 9, the sensor being an optical sensor.

11. The laboratory device according to claim 10, the sensor being a red light sensor.

12. The laboratory device according to claim 1, further comprising means for foam reduction, wherein the means for foam reduction can be operated manually and/or automatically.

13. The laboratory device according to claim 12, having a gas inlet for supplying of a gas in a metered way.

14. The laboratory device according to claim 13, the gas inlet for supplying of air or an inert gas.

15. The laboratory device according to claim 1, having an evaluation unit for evaluating a signal detected by the detection unit.

16. A control unit for a laboratory device according to claim 1, wherein the control unit is configured and/or programmed to control a device for foam reduction in response to a signal of the detection unit for foam detection.

17. The control unit according to claim 16, wherein the laboratory device further comprises a heating bath and the control unit is further configured and/or programmed to control a temperature of the heating bath, and/or wherein the evaporation flask is a rotatable evaporation flask and the control unit is further configured and/or programmed to control a rotation speed of the rotatable evaporation flask and/or wherein the control unit is configured and/or programmed to control a device for generating a reduced pressure.

18. The laboratory device according to claim 1, the laboratory device being a rotary evaporator for evaporating a substance under reduced pressure.

19. A laboratory device comprising a container for receiving a substance;

and a detection unit for detecting foam, wherein the detection unit is arranged outside of the container and/or of another element into which foam generated in the container can penetrate the detection unit having a bifurcate shape and at least partially enclosing the container and/or the element into which foam can penetrate.

20. The laboratory device according to claim 19, wherein the detection unit has at least one sensor for detecting a signal.

21. The laboratory device according to claim 20, the sensor being an optical sensor.

22. The laboratory device according to claim 19, further comprising a device for foam reduction, which device for foam reduction is controllable in response to a signal of the detection unit.

* * * * *